United States Patent
Poser

(10) Patent No.: US 7,124,872 B2
(45) Date of Patent: Oct. 24, 2006

(54) SAFETY DEVICE FOR INDUSTRIAL MACHINES

(76) Inventor: Maurizio Poser, Via Gaetano Giardino, 117, 31029 Vittorio Veneto (IT)

( * ) Notice: Subject to any disclaimer, the term of this patent is extended or adjusted under 35 U.S.C. 154(b) by 0 days.

(21) Appl. No.: 10/768,055

(22) Filed: Feb. 2, 2004

(65) Prior Publication Data
US 2004/0155533 A1   Aug. 12, 2004

(30) Foreign Application Priority Data
Feb. 7, 2003   (IT)   .......................... TV2003A0018

(51) Int. Cl.
  *F16P 3/12*   (2006.01)
  *A41D 19/015*   (2006.01)
(52) U.S. Cl. .................. 192/130; 192/129 A; 307/326; 2/16
(58) Field of Classification Search ............ 192/129 A, 192/130; 307/326; 2/16
See application file for complete search history.

(56) References Cited

U.S. PATENT DOCUMENTS 3,953,770 A * 4/1976 Hayashi ...................... 361/179
5,083,973 A * 1/1992 Townsend ..................... 452/127
5,201,684 A   4/1993 DeBois, III et al.
5,669,809 A   9/1997 Townsend et al.
2004/0237617 A1* 12/2004 Sperrer ........................ 72/31.1
2004/0244091 A1* 12/2004 Parren .......................... 2/161.6

FOREIGN PATENT DOCUMENTS

FR   2 712 837   6/1995
WO   03/027565    4/2003

* cited by examiner

*Primary Examiner*—Richard M. Lorence
(74) *Attorney, Agent, or Firm*—Modiano & Associati; Albert Josif; Daniel O'Byrne

(57) ABSTRACT

A safety device, particularly for industrial machines, such as for example bending presses provided with an upper tool that is driven in abutment toward a lower die, at least one blank, such as a metal plate, a bent plate or a box-like element, being interposable between the die and the tool, the safety device comprising a glove worn by the operator, provided with first electrically conducting regions located at the back with no conducting regions at the palm; the glove constitutes, at contact with the machine and/or with the blank, an element for transmitting electrical signal between the machine and a control unit (CU) to stop descent of the tool.

13 Claims, 4 Drawing Sheets

SAFETY DEVICE FOR INDUSTRIAL MACHINES

BACKGROUND OF THE INVENTION

The present invention relates to a safety device, particularly for industrial machines, such as bending presses for cold working of metal plates.

Said bending presses are usually constituted by a supporting frame for a die, which is arranged approximately horizontally and is conveniently shaped; a tool, such as a blade or punch, is arranged above said die and is slidingly associated with said frame.

If a blank, such as a metal plate, a bent plate or a box-like component is positioned above the die, it is possible to actuate the descent of the tool so as to force a given deformation of said blank.

The blank can be subjected to a plurality of successive bending operations, one for each descent of the tool, even along axes that are not mutually perpendicular, until it assumes the intended shape.

In order to protect the safety of the operator assigned to positioning the blank on the die, safety devices are currently used which are based for example on the use of photocells.

In particular, it is known to arrange a pair of transducers, a transmitter and a receiver, along a line that crosses longitudinally the industrial machine at a height from the die that is slightly greater than the thickness of the metal plate and at a short distance from the region occupied by the blade or punch during descent.

The photocells are connected to a control center that is suitable to block the descent of the tool when the signal transmitted between said photocells is interrupted, accordingly indicating the presence of a foreign object proximate to said tool.

The main drawback of this conventional safety device is that said known type of photocell device in some circumstances halts the industrial machine even when the operator is completely safe.

In particular, one case that occurs frequently relates to the working of box-like components or in any case of blanks that have one or more bends for example at 90°.

In this circumstance, the portion of the blank that has already been worked protrudes above the flat portion to be worked, interposing between the two photocells and therefore causing an incorrect stop of production.

In such cases there is therefore the important drawback of having to deactivate said known type of protection device, performing the operation without any assurance for the safety of the operator.

This is a severe problem for protecting operator safety; said operators, in order to work certain parts, are forced to work for most of the time without any safety device.

This problem is worsened by the fact that after a few hours of work the attention of the operator necessarily decreases, entailing an increase in the already high danger level of the use of the machine.

In any case, the lack of safety regarding certain machining operations requires great attention in performing said operations and therefore a greater expenditure of resources and increased slowness with respect to an identical machining process performed in safe conditions.

SUMMARY OF THE INVENTION

The aim of the present invention is to solve the above-mentioned problems, eliminating the drawbacks of the cited known art, by providing a safety device that allows the operator to work at all times in safe conditions regardless of the shape of the blank to be manufactured.

Within this aim, an object of the present invention is to provide a safety device that ensures the operator that the industrial machine is stopped in case of accidental contact, for example of one's fingers, with the tool, allowing the operator to work without worries.

Another object is to provide a safety device that allows to improve work speed, with a consequent increase in the efficiency of the industrial machine.

Another object is to provide a safety device that is structurally simple and has low manufacturing costs.

This aim and these and other objects that will become better apparent hereinafter are achieved by a safety device particularly for industrial machines such as for example bending presses provided with an upper tool that is driven in abutment toward a lower die, at least one blank being interposable between said die and said tool, characterized in that it comprises a glove that can be worn by the operator and is provided with first electrically conducting regions that are located approximately at the back and is not provided with conducting regions at the palm, said glove constituting, in case of contact with said industrial machine and/or with said blank, a means for transmitting an electrical signal between said industrial machine and a control unit in order to stop the descent of said tool.

BRIEF DESCRIPTION OF THE DRAWINGS

Further characteristics and advantages of the present invention will become better apparent from the following detailed description of a particular but not exclusive embodiment thereof, illustrated by way of non-limiting example in the accompanying drawings, wherein.

DESCRIPTION OF THE PREFERRED EMBODIMENTS

In the embodiments that follow, individual characteristics, given in relation to specific examples, may actually be interchanged with other different characteristics that exist in other embodiments.

Figure 1:
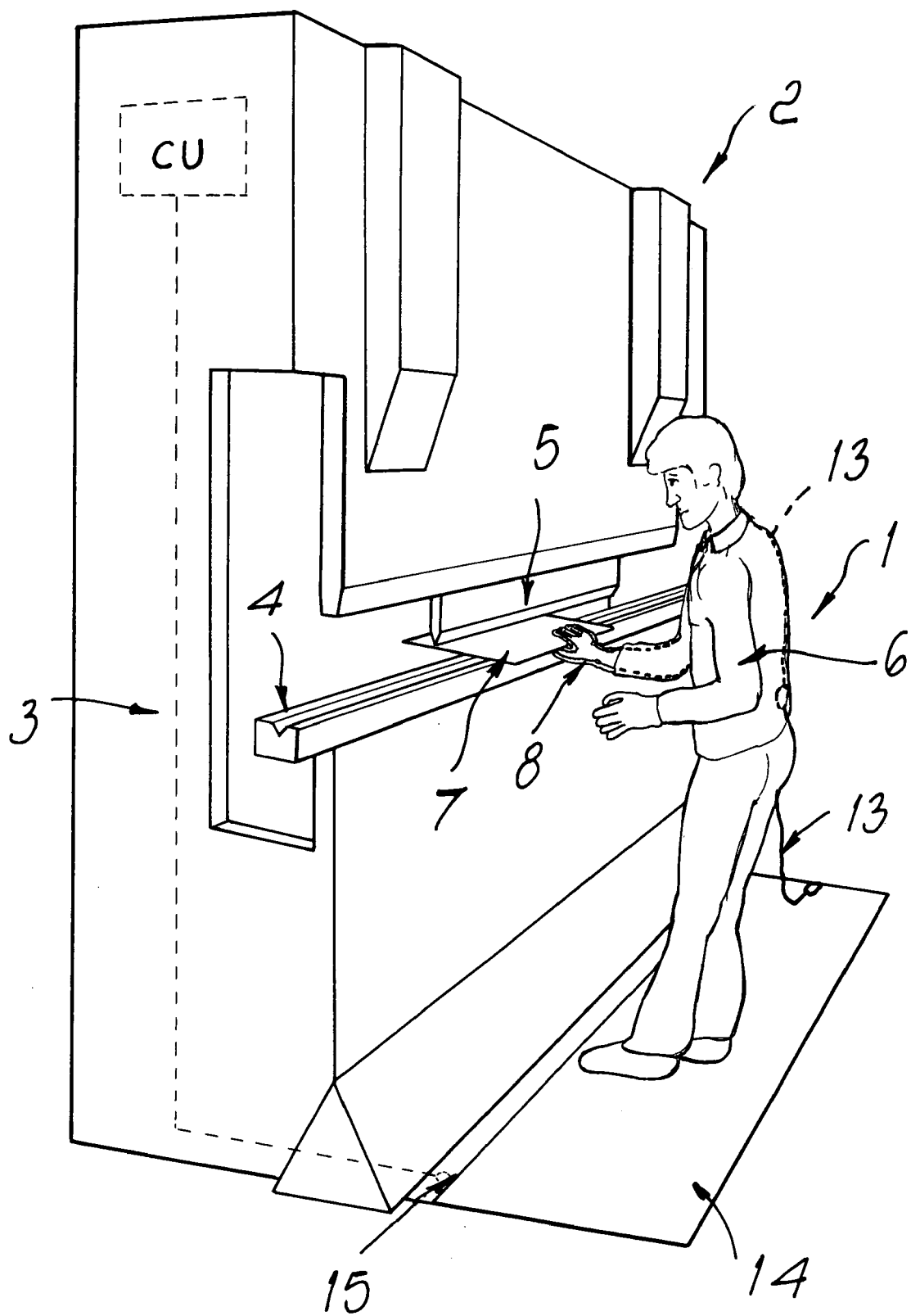
FIG. 1 is a perspective view of an industrial machine such as a bending press.

With reference to the figures, the reference numeral 1 designates a safety device particularly for industrial machines, such as for example a bending press 2 of the type with slow descent, shown in FIG. 1.

The bending press 2 comprises a supporting frame 3 for a first fixed part, such as a die, designated by the reference numeral 4.

The die 4 is usually arranged approximately horizontally and its upper surface is conveniently shaped according to a preset geometry that depends on the blank to be machined or in any case on the operation to be performed.

Above the die 4 a tool 5 is provided that constitutes a movable part, such as for example a blade or a punch, that is slidingly associated with the frame 3 along a working axis that is advantageously perpendicular to the plane of arrangement of the die 4.

Actuation means, included in the machine 2, for controlling the movement of the tool 5 are provided.

An operator 6 can interpose manually, between the die 4 and the tool 5, a blank such as for example a metal plate 7.

In this manner, every time the tool 5 descends into abutment toward the die 4, the metal plate 7 undergoes deformation and in particular is bent along the line formed by the shape and position of said tool.

The safety device 1 comprises a glove 8 that can be worn by the operator 6 and is provided with first electrically conducting regions, generally designated by the reference numeral 9, that are arranged approximately at the back of the glove 8.

Moreover, the glove 8 has no conducting regions at its palm.

Figure 2:
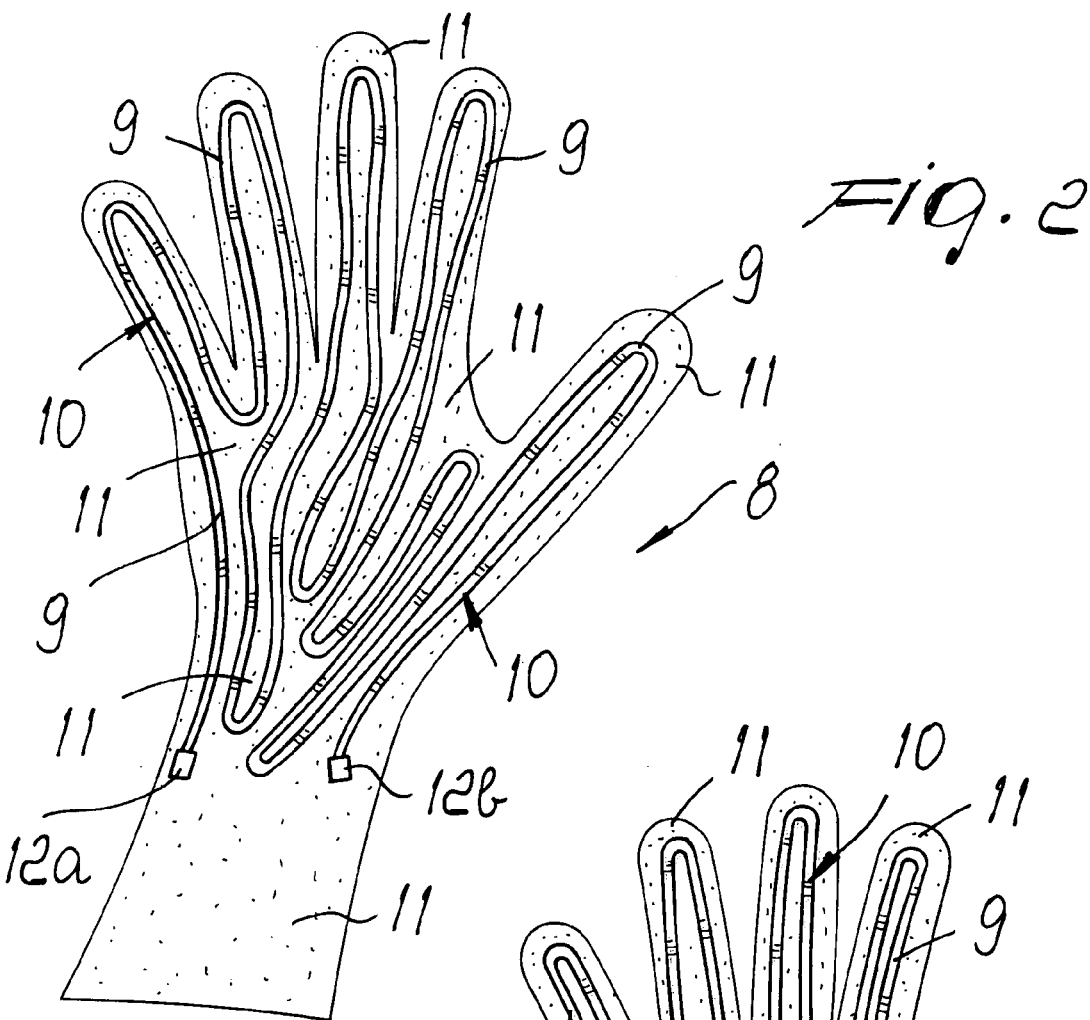
FIGS. 2 to 4 are front views of a glove according to the present invention that can be used by the operator of the industrial machine of FIG. 1.
Figure 3:
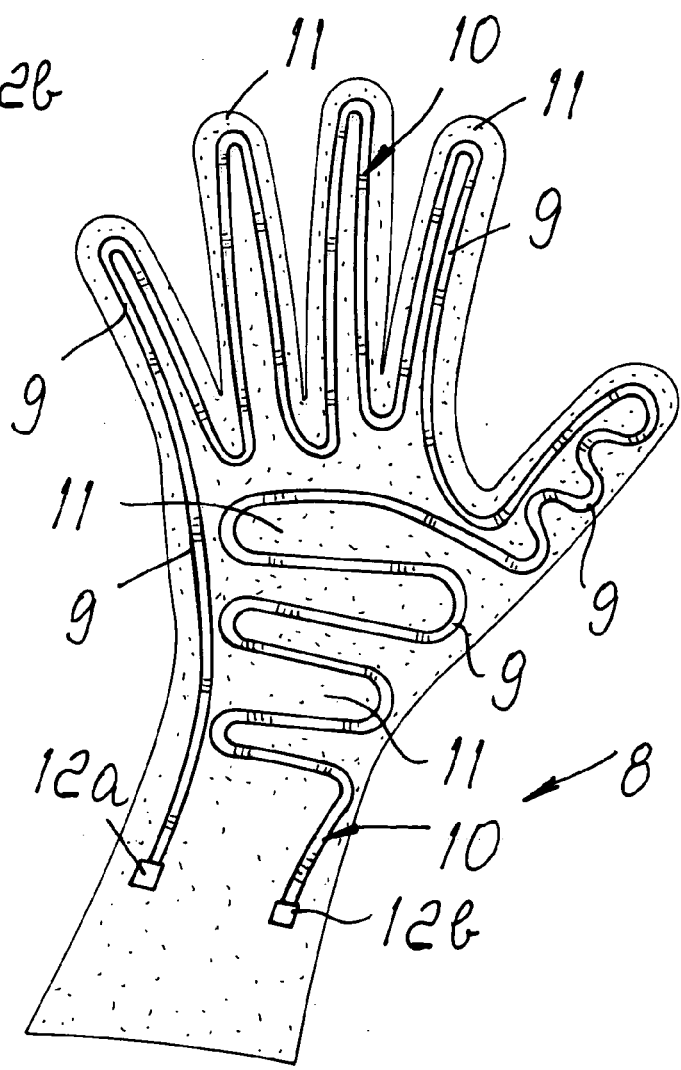
Figure 4:
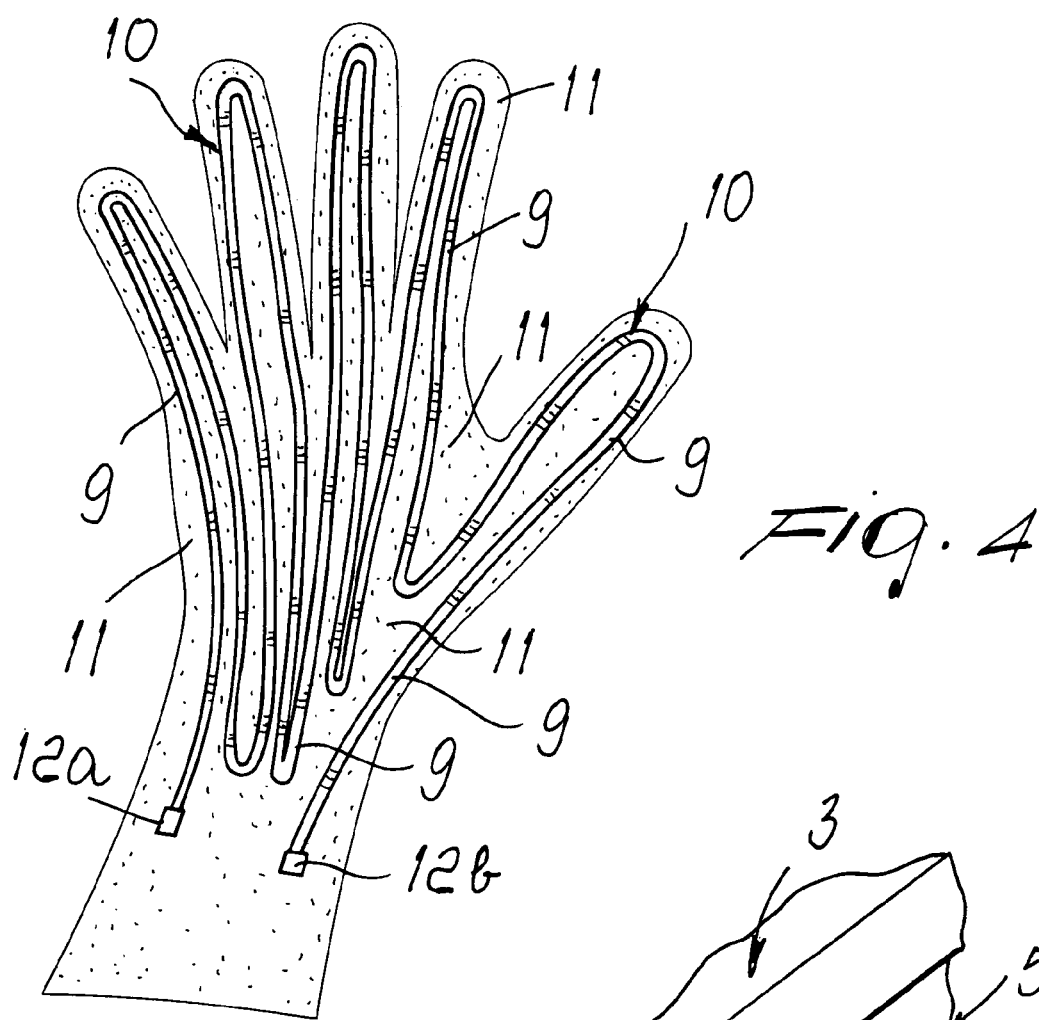
Figure 5:
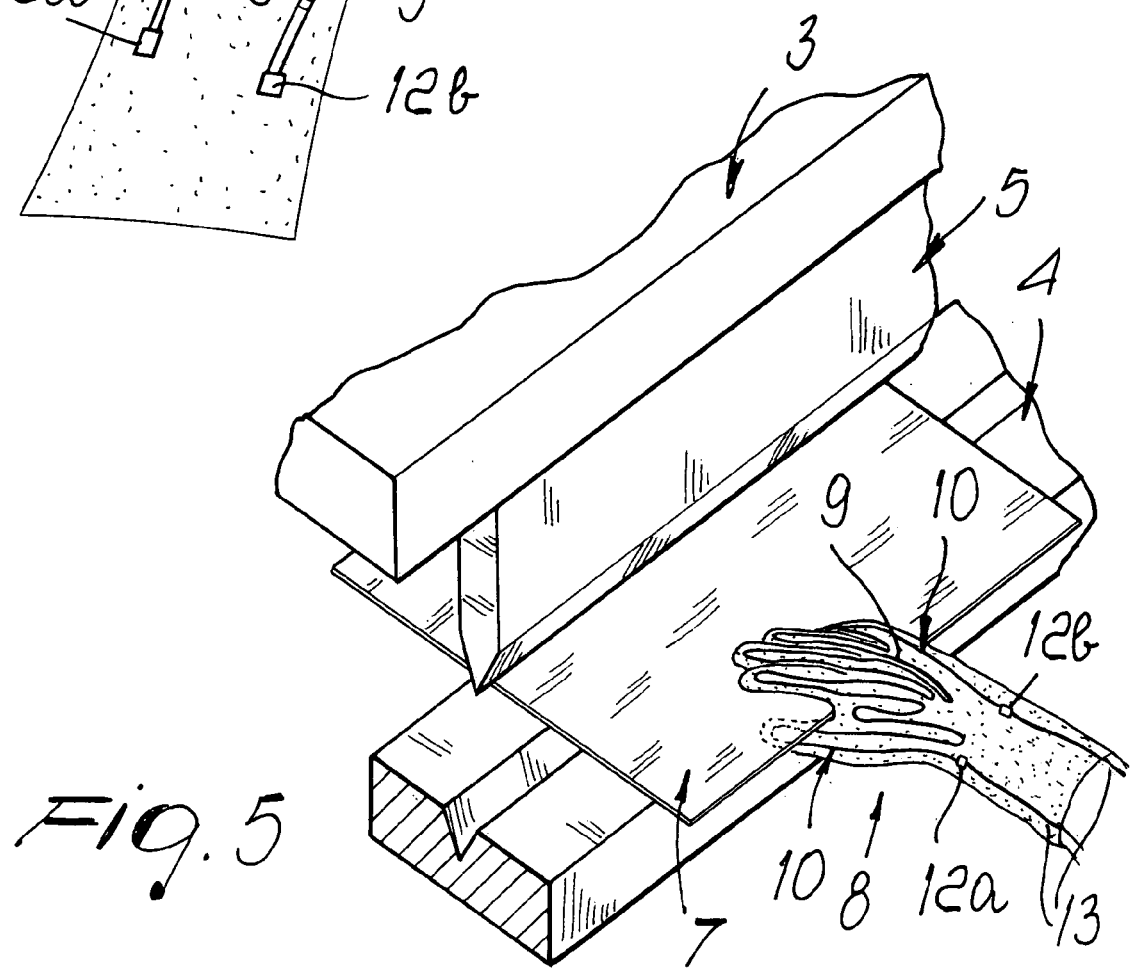
FIG. 5 is a perspective view of a detail of the industrial machine of FIG. 1, used in safe conditions.
Figure 6:
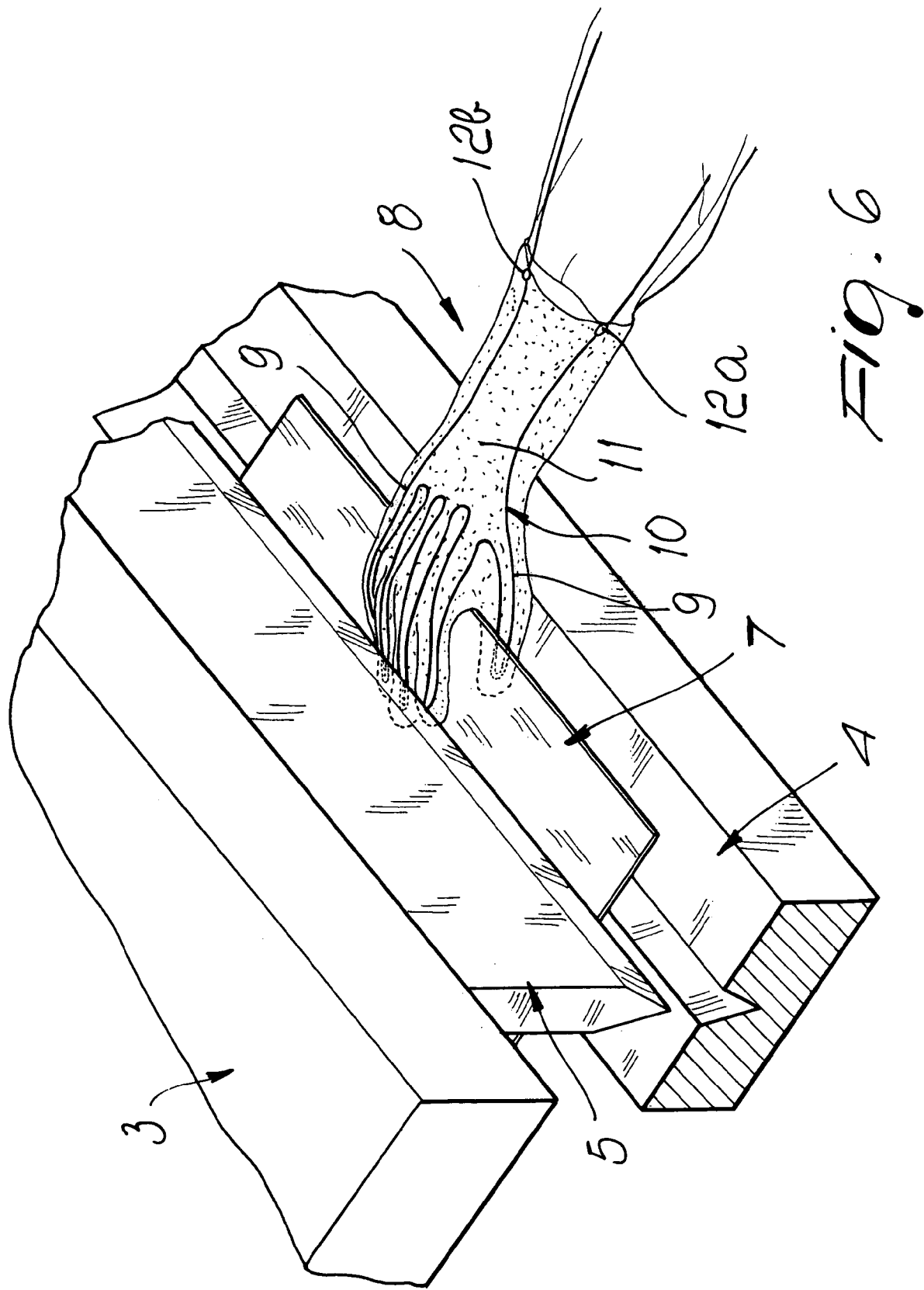
FIG. 6 is a perspective view of a detail of the industrial machine of FIG. 1, used in conditions that are dangerous for the operator.

In particular, FIGS. 2 to 4 illustrate some possible embodiments of the glove 8, in each of which the first conducting regions 9 are constituted by a strip 10 that is conveniently shaped to form a winding path so as to affect or extend over approximately the entire region of the back of the glove 8.

Such first conducting regions 9 are therefore differentiated from second nonconducting regions 11 of the back of the glove 8, which are made of a material that is not electrically conductive.

The provision of such first conducting regions 9 on the glove 8 can be achieved for example by interconnecting thereto the strip 10, which is made of an electrically conducting material, such as a metallic material or a particular conducting plastic material.

The strip 10 can be associated with the back of the glove 8, which does not conduct, for example by sewing, gluing, thermal bonding or by way of a molding operation.

As an alternative, it is possible to use electrically conducting paints that are sprayed onto the glove by interposing suitable mechanical or electrostatic masks.

It is also possible for example to provide in a single operation the direct molding of the glove including the strip 10.

In any case, the connection of the first conducting regions 9 must not modify substantially the mechanical characteristics of the glove 8, particularly finger flexing.

In this particular embodiment, illustrated merely by way of example, the strip 10 has two ends, designated by the reference numerals 12a and 12b, that are arranged approximately in the wrist region.

One or more first cables, generally designated by the reference numeral 13, can be connected detachably to the ends 12a and 12b and can be coupled temporarily to the item of clothing of the operator 6 in order to constitute a transmitting means that transmit a signal, preferably an electric signal, between the bending press 2 and a control unit CU and controls the stopping of the descent of the tool 5.

In particular, the control unit CU is suitable to control for example any flow of electrical current in a first circuit that is normally open and therefore without current and comprises the bending press 2, the first conducting regions 9 of the glove 8, the cable 13 and any means for transmitting the electrical signal that can be interposed between the cable 13 and the control unit.

For example, in the embodiment of FIG. 1 the first cable 13 transmits the signal to a mat 14, which is made of conducting material and is in turn electrically connected by means of a second cable 15 to the control unit, which is advantageously accommodated and connected to the bending press 2.

If the glove 8 makes contact with the tool 5, the first circuit closes and therefore the descent of the tool 5 is halted.

The shape of the glove 8 advantageously entails the provision of a single strip 10 of conducting material, since the control unit monitors the flow of current within a second circuit that comprises indeed the strip 10.

In this manner, if the first conducting regions 9 are partially damaged, with breakage of the strip 10 in one or more points, the control unit detects an interruption or a considerable reduction in the current in the second circuit, accordingly stopping the press 2 or indicating in various manners to the operator or to the department manager the possible failure of the safety device 1.

Such safety device 1 according to the present invention can be used alone but it can be preferably associated with a separate safety device of a known type, such as the photocell safety device described above, that intervenes whenever it is necessary to deactivate said device.

Operation is therefore as follows: with reference to FIG. 1, the operator 6 must wear, during work, at least one glove 8 that is conveniently connected to the conducting mat 14 and to the control unit.

Such control unit checks the correct functionality of the glove by detecting the current in the second circuit and indicates, in case of failure, the need to replace the glove being used with a new one.

The operator can work normally at the bending press 2, touching the die 4 and the blank 7, since the palm of the glove is nonconducting and therefore does not close the first circuit.

However, if the operator accidentally inserts his hand between the tool 5 and the die 4, the contact of the back of the glove with said tool forces the halting of the press 2, accordingly protecting the integrity of the operator.

It has thus been shown that the invention has achieved the intended aim and objects, a safety device having been devised that allows the operator to work in safe conditions regardless of the shape of the blank to be manufactured.

The safety device in fact halts the industrial machine immediately, as soon as contact occurs between the conducting regions of the glove and the descending tool, accordingly allowing the operator to work in absolute confidence.

Said safety device further allows to improve the operating speed, with a consequent increase in the efficiency of the industrial machine.

The invention is of course susceptible of numerous modifications and variations, all of which are within the scope of the appended claims.

Thus, for example, it is possible to provide a safety device in which the first circuit comprises wireless transmission means for transmission of the signal, for example by means of radio frequencies, ultrasound or infrared beams, so that each operator wears a transmitter that is electrically connected to the glove and communicates with the control unit.

In this manner one might avoid the hindrance due to the first cable.

Moreover, the second circuit for detecting correct functionality of the glove might optionally be omitted, or might not be connected to the control unit.

For example, it is possible to provide a second circuit that is completely accommodated within the glove and comprises a sensor constituting indication means for detecting the flow of current and for providing an indication if the circuit is open.

The invention may of course also be applied to other industrial machines, preferably slow-moving ones, such as for example bending presses provided with an upper fixed punch and with a lower movable die that can be moved so as to abut against the punch.

The materials used, as well as the dimensions that constitute the individual components of the invention, may of course be more pertinent according to specific requirements.

The various means for performing certain different functions need not certainly coexist only in the illustrated embodiment but can be present per se in many embodiments, including ones that are not illustrated.

The disclosures in Italian Patent Application No. TV2003A000018 from which this application claims priority are incorporated herein by reference.

What is claimed is:

1. A safety device in combination with an industrial machine provided with a control unit and with at least a first and a second parts, said first part being movable in abutment toward the second part that is provided fixed, and with at least one blank being interposable between said first and second parts, the safety device comprising: at least one glove worn by an operator, said glove being provided with first electrically conducting regions and with second nonconducting regions, and constituting, in case of contact with the industrial machine and/or with the blank, a transmitting means for transmitting an electrical signal between the industrial machine and the control unit, in order to stop movement of said first movable part, the safety device further comprising a first electrical circuit, that is electrically separate of the operator and that is open and without current in an operating mode of said machine for movement of said first movable part, said first electrical circuit comprising; said first electrically conducting regions on said glove; said industrial machine; and said transmitting means such that said first electrical circuit is electrically closed when said first movable part makes contact with said first electrically conducting regions for halting the movement of said first movable part.

2. A safety device for an industrial machine that is provided with a control unit, with an upper tool driven into abutment toward a lower die, and with at least one blank that is interposable between said die and said tool, the device comprising at least one glove that is worn by an operator, is provided with first electrically conducting regions that are located at a back region of the glove and is free from conducting regions at a palm region thereof, said glove constituting, in case of contact with the industrial machine and/or with the blank, a transmitting means for transmitting an electrical signal between the industrial machine and the control unit in order to block movement of the tool, the safety device further comprising a first circuit electrically separate from the operator, between said at least one glove, said control unit and said industrial machine, said first circuit being closeable electrically upon contact of said first conducting regions with said tool.

3. The safety device of claim 2, further comprising an electrically conducting strip comprising said first electrically conducting regions in the form of a continuous electrically conducting strip path located on the back region of the glove between ends of said continuous electrically conducting strip path and electrically connected to said control unit and surrounded by second electrically nonconducting regions also located on the back region of the glove, such that said control stops operation of the industrial machine upon detection of a current loss in said continuous electrically conducting strip path.

4. A safety device for an industrial machine that is provided with a control unit, with an upper tool driven into abutment toward a lower die, and with at least one blank that is interposable between said die and said tool, the device comprising at least one glove that is worn by an operator, is provided with first electrically conducting regions that are located at a back region of the glove and is free from conducting regions at a palm region thereof, said glove constituting, in case of contact with the industrial machine and/or with the blank, a transmitting means for transmitting an electrical signal between the industrial machine and the control unit in order to block movement of the tool, the safety device further comprising a first circuit electrically separate from the operator, between said at least one glove, said control unit and said industrial machine, said first circuit being closeable electrically upon contact of said first conducting regions with said tool, said first conducting regions of said at least one glove comprising a strip of electrically conducting material that extends over at least a finger region of the back region of said glove.

5. The safety device of claim 4, wherein said strip is shaped contoured along an open and winding path, so as to extend over all of the regions of the back region of said glove.

6. The safety device of claim 4, wherein said strip forms on the back region or said at least one glove second electrically non-conducting regions that are connected to the palm region of said glove.

7. The safety device of claim 4, wherein said first conducting regions of said at least one glove are provided by connection of said strip to the glove, said strip being made of electrically conducting material, selected from a group comprising metallic materials and particular conducting plastic materials.

8. The safety device of claim 7, wherein said strip is associated with the back region of said at least one glove with a sewing or gluing connection.

9. The safety device of claim 7, wherein said strip is associated with the back region of said at least one glove with a thermal bonding or molding connection.

10. The safety device of claim 7, wherein said at least one glove, comprising a back region with first conducting regions and second nonconducting regions and a nonconducting palm region, is provided as a single molded piece.

11. The safety device of claim 4, wherein said first conducting regions are provided by electrical deposited conducting paints deposited onto the back region of said at least one glove.

12. The safety device of claim 4, comprising a plurality of first cables, said first conducting regions being connected electrically, by way of said first cables, to the control unit that is further connected to the industrial machine, so as to form said first circuit between said tool and said glove.

13. The safety device of claim 12, wherein at closure of said first circuit, the control unit stops movement of said tool and optionally deactivates the industrial machine.

* * * * *